(12) United States Patent
Miyamoto

(10) Patent No.: US 6,191,871 B1
(45) Date of Patent: Feb. 20, 2001

(54) IMAGE-READING METHOD AND APPARATUS

(75) Inventor: Shigeo Miyamoto, Nara (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/090,972

(22) Filed: Jun. 5, 1998

(30) Foreign Application Priority Data

Jun. 16, 1997 (JP) .................................................. 9-158983

(51) Int. Cl.[7] .................................................. H04N 1/04
(52) U.S. Cl. .......................... 358/486; 358/496; 358/498; 358/474
(58) Field of Search .................................. 358/486, 474, 358/496, 498, 1.2, 1.12, 1.18, 412; 318/696, 685

(56) References Cited

U.S. PATENT DOCUMENTS

| | | | |
|---|---|---|---|
| 5,517,331 | * 5/1996 | Murai et al. | 358/486 |
| 5,668,637 | * 9/1997 | Yamaguchi | 358/296 |
| 5,684,601 | * 11/1997 | Endo et al. | 358/298 |
| 5,796,928 | * 8/1998 | Toyomura et al. | 395/106 |

FOREIGN PATENT DOCUMENTS

| | | |
|---|---|---|
| 62-191261 | 12/1987 | (JP) . |
| 63-257382A | 10/1988 | (JP) . |
| 01305768A | 12/1989 | (JP) . |
| 01307363A | 12/1989 | (JP) . |
| 05075780A | 3/1993 | (JP) . |
| 5145715 | 6/1993 | (JP) . |

* cited by examiner

Primary Examiner—Cheukfan Lee

(57) ABSTRACT

An image-reading method which allows a transporting motor to transport, relative to each other, an original document having an image to be read and a light-receiving element for scanning the image in the width direction, so as to read the image in a direction that is orthogonal to the width direction. The method allows the light-receiving element to read the image and output the resulting image data. The transporting speed of the transporting motor is increased based on the desired suppression in the resolution of the image data. Therefore, a facsimile machine using the above-mentioned method can read the image of an original document with a desired resolution.

18 Claims, 3 Drawing Sheets

IMAGE-READING METHOD AND APPARATUS

FIELD OF THE INVENTION

The present invention relates to an image-reading method and apparatus in which, while a reading member is being transported relative to an original document by moving a document platen or shifting an optical system, the original document is scanned in the orthogonal direction to the transporting direction so as to read the original image.

BACKGROUND OF THE INVENTION

An image reading section is installed in apparatuses such as a facsimile machine, a copying machine and an image scanner serving as a peripheral device of a personal computer. In such an image reading section, a method is adopted in which an original image is read while a reading member is being transported relative to an original document as described above. Here, in the image reading section, normally, the discrimination F (mm/step), which corresponds to the amount of feed of the original document per 1 step of a feeding motor, and the resolution P (mm/line) of the reading member are coincident with each other. Therefore, in an apparatus such as the above-mentioned facsimile machine, when the feeding motor makes one revolution (step), the reading member also carries out one reading operation for one (line).

However, alternation of the resolution P is demanded, for example, in cases such as the standard-letter mode and minute-letter mode in a facsimile machine. In order to meet such a demand, for example, Japanese Laid-Open Patent Publication No. 75780/1993 (Tokukaihei 5-75780) has disclosed a typical conventional technique. In this conventional technique, when a reading operation is carried out by using the resolution reduced to 1/n of the maximum resolution, respective "n" number of adjacent CCDs (Charge Coupled Devices) serving as the reading members are connected in parallel with one another so as to addition-combine the outputs of the pixels.

Therefore, the problem with this conventional technique is that it is not applicable unless the desired resolution P is set at an integral multiple of the discrimination F.

Moreover, Japanese Laid-Open Patent Publication No. 145715/1993 (Tokukaihei 5-145715) is listed as another conventional technique. In this conventional technique, supposing that the normal transport speed is V, a transporting operation is carried out at a low speed in the range of V/2 to V, and a predetermined number of scanning lines are disabled depending on the transporting speed.

The subsequent problem with this conventional technique is the occurrence of image distortion due to the disabled scanning lines.

Similarly, Japanese Laid-Open Utility Model Publication No. 191261/1987 (Jitsukaishou 62-191261) has disclosed another conventional technique in which lines that have been read are counted and thinned out so as to fit the resolution on the playback side.

Therefore, the subsequent problem with this arrangement is also the occurrence of image distortion due to the thinning-out process on the above-mentioned lines.

In order to solve these problems, Japanese Laid-Open Patent Publication No.257382/1988 (Tokukaishou 63-257382) has disclosed a conventional technique which can change the resolution P while suppressing image distortion even if the resolution P is not set at an integer multiple of the discrimination F. In this conventional technique, after a reading operation has been carried out with the discrimination F of the transporting motor being set at a predetermined value, conversion to a desired resolution P is made by operation processing on a software basis.

Furthermore, another conventional technique proposes a method in which supposing that the reading speed of a reading member is Vp (msec/line), image data of the entire original document is converted by using a buffer memory so that the transporting speed Vf (msec/step) of a transporting motor can satisfy the following equation (1):

$$Vf \times j = Vp \times k \qquad (1),$$

where j and k are arbitrary integers.

In addition, in the above-mentioned technique, another modified method is proposed in which in the case when, upon using the above-mentioned equation (1), the capacity of the buffer memory has an image-data amount less than one page of an original document, the reading operation of the reading member is temporarily stopped when the buffer memory becomes full.

However, the method using the operation processing on a software basis raises the following problems: an operation processing circuit is required, image distortion occurs due to the operation processing, and the time required for the operation processing gives adverse effects on the entire reading time.

Moreover, another problem with the method using the buffer memory is that a large memory, that is, a memory large enough to store the amount of image data corresponding to at least one page of original document, is required in order to carry out a smooth reading operation, thereby resulting in high costs.

Furthermore, in the method in which the reading operation is stopped when the buffer memory becomes full, upon stoppage of a reading operation, an accumulated offset takes place which is equivalent to the number of lines that have been read and which corresponds to the difference between the discrimination F of the transporting motor and the resolution P of the reading member. This results in an image distortion corresponding to one line, in the very worst case.

SUMMARY OF THE INVENTION

The objective of the present invention is to provide an image-reading method and apparatus which can suppress image distortion by using only a small memory capacity.

In order to achieve the above-mentioned objective, the image-reading method of the present invention comprises the steps of: allowing a transporting member to transport relative to each other an original document having an image to be read and a reading member for scanning the image in a first direction so as to read the image in a second direction that is orthogonal to the first direction; and allowing the reading member to output the image as image data that has been read, wherein the transporting speed of the transporting member is increased in accordance with a desired suppression in the resolution in the image data.

In the above-mentioned method, the above-mentioned transporting member is a stepping motor for intermittently carrying out the transporting operation, and supposing that the discrimination corresponding to a minimum transporting interval of the transporting member is F (mm/step), a desired resolution is P (mm/line) and an acceptable error in the image data is $\pm\alpha$, integers n and i that satisfy the following inequalities are found:

$$1-\alpha \leq (F \times n)/(P \times i) \leq 1+\alpha,$$

wherein supposing that the reading speed of the reading member is Vp (msec/line), the transporting speed Vf (msec/step) of the transporting member is preferably set as follows:

$$Vf = Vp \times i/n.$$

With the above-mentioned method, the transporting speed of the transporting member is increased in accordance with a desired degree of suppression in the resolution so that the transporting speed of the original document is increased; thus, the image data can be read with a desired resolution.

Therefore, for example, in the case of facsimile machines for carrying out image transmissions, based upon a standard, etc. on communication, an original image is read by using a desired low resolution, and in the case of copying machines and printers, based upon a standard, etc., stipulated inside or outside the office, an original image is read by using a desired low resolution.

For a fuller understanding of the nature and advantages of the invention, reference should be made to the ensuing detailed description taken in conjunction with the accompanying drawings.

DESCRIPTION OF THE EMBODIMENTS

Figure 1:
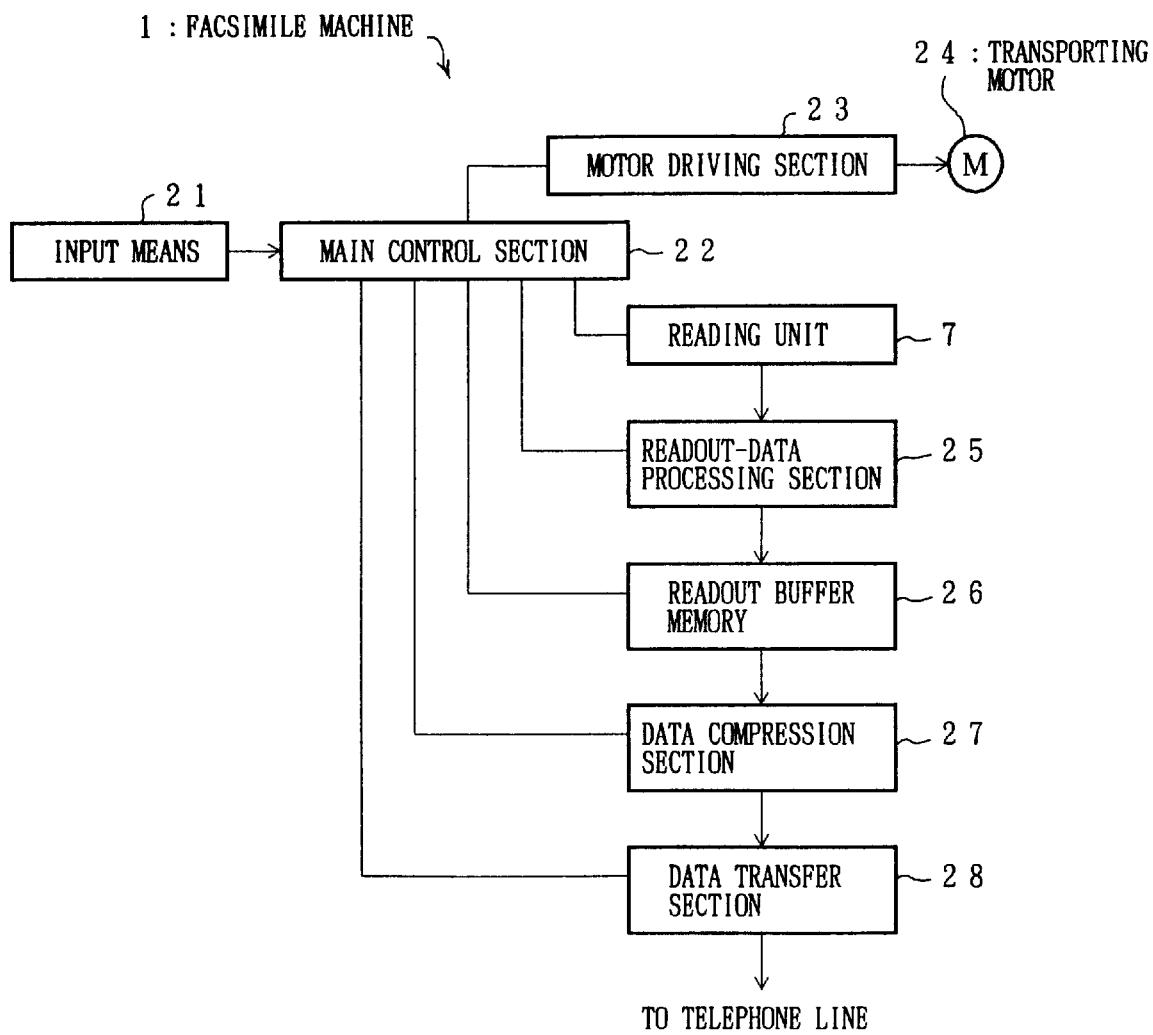
FIG. 1 is a block diagram showing an electrical construction of a portion related to transmission in a facsimile machine in which an image-reading method of one embodiment of the present invention is used.
Figure 2:
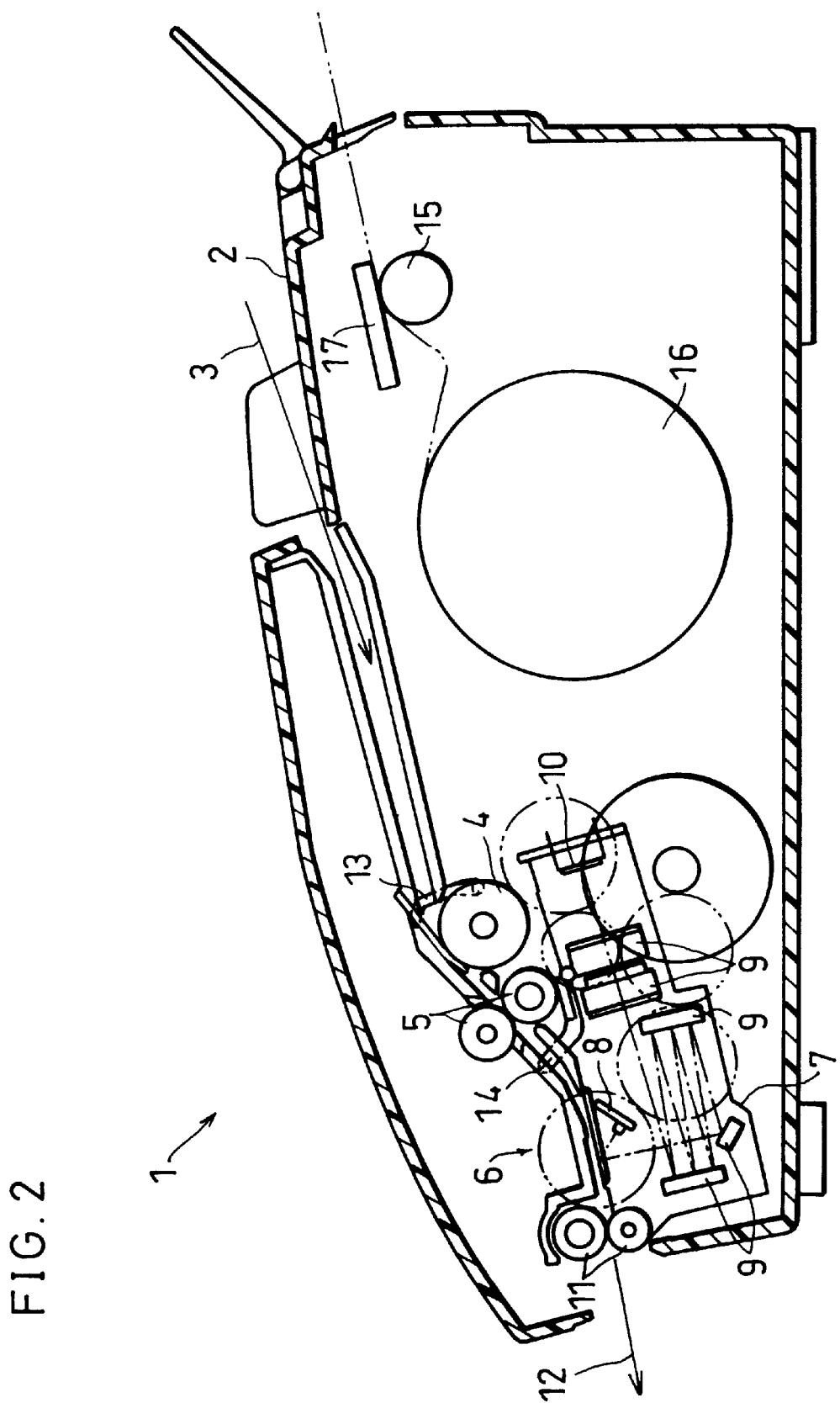
FIG. 2 is a schematic cross-sectional view showing a structural example of the facsimile machine to which the construction shown in FIG. 1 is applied.
Figure 3:
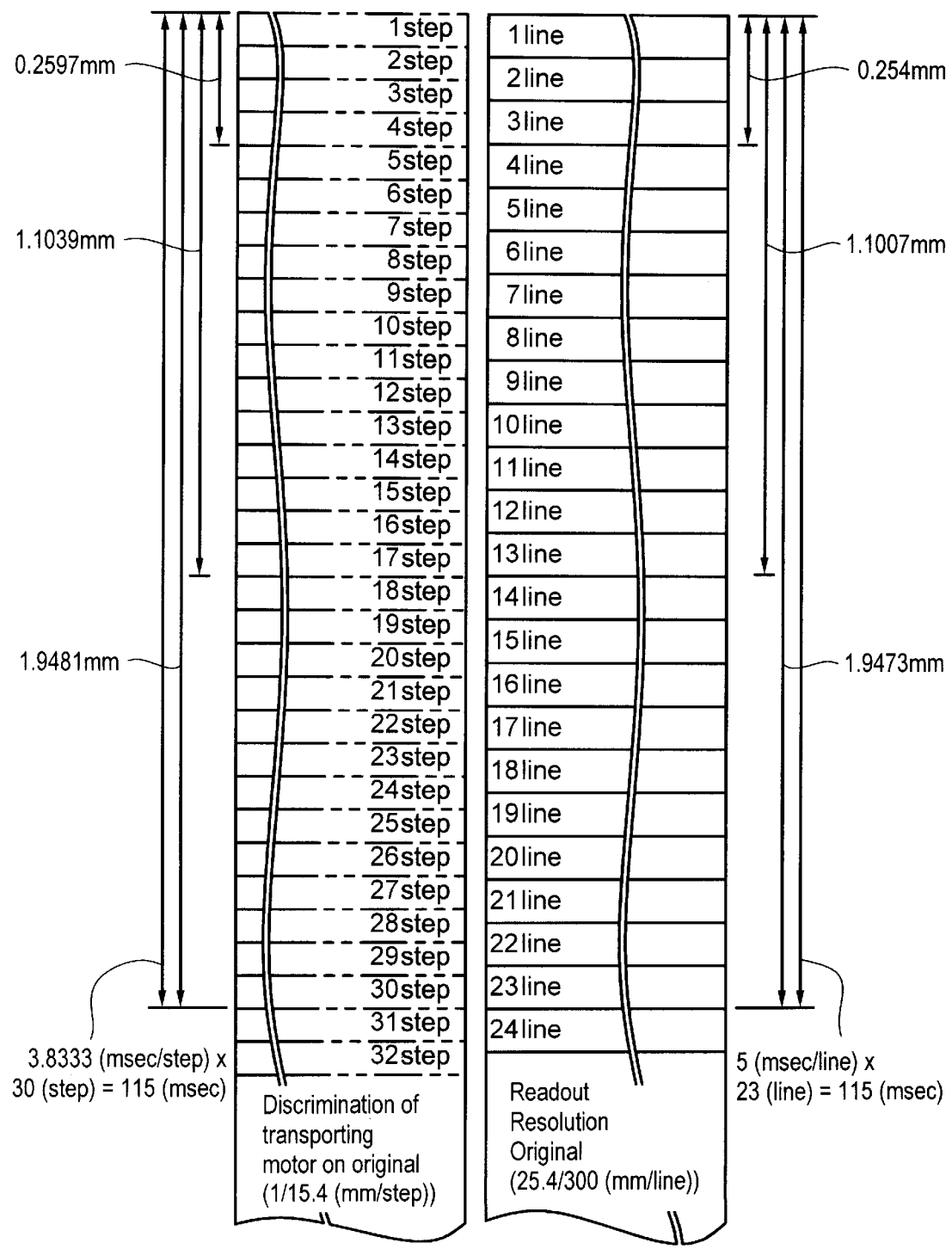
FIG. 3, which explains a reading method of the present invention, is a drawing that indicates the relationship between the discrimination of the transporting motor and a desired reading resolution for an original document.

Referring to FIGS. 1 through 3, the following description will discuss one embodiment of the present invention.

FIG. 1 is a block diagram showing an electrical construction of a portion related to transmission in a facsimile machine 1 serving as an image-reading apparatus in which an image-reading method of the present embodiment is used. FIG. 2 is a schematic cross-sectional view showing a structural example of the facsimile machine 1 shown in FIG. 1

First, as illustrated in FIG. 2, original documents, placed on a document platen 2, are fed in a manner as shown by arrow 3, and separated by a feeding roller 4 one by one. Thereafter, the original document is transported to a reading region 6 by a pair of first transport rollers 5. A reading unit (reading member) 7 is placed adjacent to the reading region 6. The original document at the reading region 6 is irradiated with light from a light-emitting element 8 in the reading unit 7. Then, the light reflected from the original document is directed to a light-receiving element 10 through optical members 9 such as mirrors and lenses.

The light-receiving element 10 is constituted by a line image sensor consisting of CCDs. More specifically, the light-receiving element 10 is arranged such that the elements are aligned on a straight line along the width direction of the original document (a first direction), that is, the direction orthogonal to the transporting direction of the original document (a second direction) indicated by arrow 3. The output of each of the light-receiving elements 10 is successively read so that a main scanning operation is carried out on the original image. Further, the above-mentioned original document is discharged from the facsimile machine 1 as indicated by arrow 12 by the first transport roller 5 and the second transport roller 11 that is placed on the downstream side of the reading region 6. Thus, the scanning operation of the original image in the transporting direction, that is, the sub-scanning, is carried out.

With respect to the above-mentioned rollers 4, 5 and 11, a transporting motor 24 (see FIG. 1) for driving these rollers 4, 5 and 11 are controlled in accordance with the results of detection made by a front sensor 13 and an original sensor 14, in a manner as will be described later. Consequently, a transporting operation at a speed suitable for desired leading-end positioning and reading resolution can be carried out.

Moreover, the image data, which has been obtained by reading the original image, is compressed and transmitted through a telephone line, which will be described later in detail. Furthermore, the compressed data, received through a telephone line, is decompressed and restored to image data. The image data is copied by a recording head 17 onto recording paper that is drawn from a recording-paper roll 16 by a recording-paper roller 15 as an image derived from the image data. The recording paper bearing the copied image is discharged from the facsimile machine 1.

Basically, as illustrated in FIG. 1, original documents that are to be transmitted are placed on the document platen 2 and information about the transmission end, etc., is inputted through an input means 21. In this case, after a communication line has been established to the transmission end, a main control section (a control member, a readout control member) 22 operates the reading unit 7, thereby allowing it to carry out a reading operation of the original image. Simultaneously, the main control section 22 drives the transporting motor (the transporting member) 24 through a motor driving section 23 so that the original-transporting speed (transport speed) Vf (msec/step) is synchronized by the reading speed Vp (msec/line) of the reading unit 7. The above-mentioned reading speed Vp is set, for example, at 5(msec/line). The data thus read is analog/digital converted by a readout-data processing section 25, and then temporarily stored in a readout buffer memory (buffer memory) 26. The data thus stored is compressed by a data compression section 27 based upon the communication standard for facsimile machines, and then outputted to a telephone line from a data transfer section 28.

Additionally, in the construction as shown in FIG. 1, the front sensor 13 and the original sensor 14 are omitted.

A stepping motor is normally used as the transporting motor 24 in order to vary the transporting speed Vf, that is, a feeding speed of original documents, in association with processes such as a compression process.

Here, as shown in Table 1, in the facsimile machine, the resolution P (mm/line), which deals with a plurality of kinds of modes ranging from Standard Mode applied to normal characters to Super Fine Mode applied to minute characters, is determined based upon the standard.

The discrimination F (mm/step) of the transporting motor 24 is set at 1/15.4(mm/step) that corresponds to the minimum resolution 1/15.4(mm/step). Therefore, in response to the respective modes specifying various resolutions inputted from the input means 21, the main control section 22 controls the transporting speed Vf of the transporting motor 24 so as to achieve the resolution that is suitable for the inputted mode by using the minimum resolution as a standard.

In other words, the main control section 22 controls the transporting speed Vf of the transporting motor 24 in accordance with the resolution mode. More specifically, in the case of Super Fine Mode, a reading operation of 1(line) is carried out in response to a driving operation of 1(step) of the transporting motor 24. In the case of Fine Mode, a reading operation of 1 (line) is carried out in response to a driving operation of 2(step) of the transporting motor 24. In the case of Standard Mode, a reading operation of 1(line) is carried out in response to a driving operation of 4(step) of the transporting motor 24.

TABLE 1

| Mode | Resolution P (mm/line) |
|---|---|
| Standard | 1/3.85 (= 4 × 1/15.4) |
| Fine | 1/7.7 (= 2 × 1/15.4) |
| Super Fine | 1/15.4 |

As described above, in the case when the resolution P is an integer multiple of the discrimination F of the transporting motor 24, the resolution P is appropriately varied by driving the transporting motor 24 step by step in each reading operation of 1(line).

However, in the case when the resolution P is not an integer multiple of the discrimination F, it is not possible to carry out a sub-scanning operation with a desired resolution P. For this reason, in the present invention, the main control section 22 carries out the following operations so as to properly control the transporting speed Vf of the transporting motor 24 even in the above-mentioned case.

For example, it is supposed that the discrimination F of the transporting motor 24 is set at 1/15.4(mm/step) corresponding to Super Fine Mode of the above-mentioned facsimile machine and that a desired resolution P is set at 25.4/300(mm/line), which is a common example for a printer used in a personal computer. Therefore, the resolution P is not an integer multiple of the discrimination F, and the resolution P is represented by:

$$P \neq F \times n \quad (2),$$

where n is an arbitrary integer.

Here, in the present invention, supposing that an allowable error is ±α, arbitrary integers n and i that satisfy the following inequality are found:

$$1-\alpha \leq (F \times n)/(P \times i) \leq 1+\alpha \quad (3),$$

where α is in the range of 0<α<1.

For example, if n=30(step) and i=23(line) are selected, then the following calculations are made:

$$(F \times n)/(P \times i) = \{1/15.4(\text{mm/step}) \times 30(\text{step})\}/ \quad (4)$$

$$\{25.4/300(\text{mm/line}) \times 23(\text{line})\}$$

$$= 1.94805/1.94733$$

$$= 1.00036$$

Therefore, an error α=0.036(%) is obtained.

Similarly, if n=4(step) and i=3(line) are selected, α=2.260 (%) is obtained. If n=17(step) and i=13(line) are selected, α=0.293(%) is obtained. FIG. 3 shows these relationships.

Among the above-mentioned combinations, selection of the above-mentioned integers n and i is carried out based upon errors that are allowable for the machine's performance, such as ±1.5(%) which conforms to the G3-mode communication standard for the facsimile machine and 0.2 to 0.3 (%) which conforms to the ITU-T (international telecommunication union-telecommunication recommendation) standard for the facsimile machine.

For example, if n=30(step) and i=23(line) are selected as described above, the main control section 22 drives the transporting motor 24 by using a unit block obtained as follows:

$$L=P \times i=25.4/300(\text{mm/line}) \times 23(\text{line})=1.9473(\text{mm}) \quad (5),$$

while setting the transporting speed Vf of the motor at a constant speed obtained as follows:

$$Vf=Vp \times i/n=5(\text{msec/line}) \times 23(\text{line})/30(\text{step})=3.8333(\text{msec/step}) \quad (6).$$

Moreover, in this case, the capacity of the readout buffer memory 26 is set at a value not less than the value corresponding to the above-mentioned unit block L (mm). Therefore, supposing that the resolution of the main scanning operation is, for example, 25.4/300(mm/dot) and the width of the original document is, for example, 216(mm) corresponding to the width of letter format, the following calculation is made:

$$300/25.4(\text{dot/mm}) \times 216(\text{mm}) \times 23(\text{line})=58.7(\text{Kbit}) \quad (7).$$

This memory capacity is determined by taking the aforementioned α, etc. into consideration, based upon the aforementioned unit block L.

As described above, in the present invention, even if a desired resolution P is not an integer multiple of the discrimination F of the transporting motor 24, the integers n and i that satisfy inequality (3) in the range of allowable error α are found. Then, the transporting speed Vf of the transporting motor 24 is found by equation (6), and the transporting motor 24 is driven at the constant transporting speed Vf by using the unit block L as a transporting unit. Thus, the desired resolution P is provided.

Therefore, it is not necessary for the readout buffer memory 26 to have a large capacity corresponding to one page of the original document, and it becomes possible to provide any desired resolution P while suppressing the occurrence of distortion in images by using a lower-cost construction as compared with a conventional system.

Additionally, in the above-mentioned construction, the reading speed Vp of the reading unit 7 is made constant. The reading speed Vp is normally set at a constant value based upon the brightness of the light-emitting elements 8 and the sensitivity of the light-receiving elements 10. However, the desired resolution P may be provided by an arrangement in which the reading speed Vp is varied. Moreover, the desired resolution P may be obtained by an arrangement in which both the reading speed Vp and the transporting speed Vf are varied.

Not limited to the above-mentioned facsimile machine 1, the present invention may be preferably applied to common apparatuses such as copying machines and scanners that carry out an image-reading operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-reading method comprising:
   transporting, relative to one another, an original document having an image to be read and a reading member for scanning the image in a first direction so as to read the image in a second direction orthogonal to the first direction; and allowing the reading member to output the image as read image data, wherein transporting speed of the transporting member is increased in accordance with a desired suppression in resolution in the image data, wherein said transporting member is a stepping motor for intermittently carrying out the transporting operation;

wherein, supposing that a discrimination of the transporting member, that is, a minimum transporting interval, is F (mm/step) and a desired resolution is P (mm/line), and that an error that is allowable based upon a standard applied thereto is ±α, arbitrary integers n and I that satisfy the following inequality are found:

$$1-\alpha<(F\times n)/(P\times I)<1+\alpha;$$

and wherein, supposing that the reading member has a reading speed Vp (msec/line), the transporting member has a transporting speed Vf (msec/step) that is set as follows:

$$Vf=Vp\times i/n.$$

2. The image-reading method as defined in claim 1, wherein the desired resolution P per one line is different from an integral multiple of the discrimination per one step.

3. The image-reading method as defined in claim 1, wherein the reading member performs an image-reading operation using P×I=L (mm) as a unit blocks, so that the transporting speed Vf is constant within the unit block.

4. The image-reading method as defined in claim 3, wherein the image data is stored and outputted for each unit block.

5. The image-reading method as defined in claim 4, wherein the image data is compressed and outputted.

6. The image-reading method as defined in claim 1, wherein the desired resolution P is set by varying the reading speed Vp.

7. The image-reading method as defined in claim 1, wherein the discrimination of the transporting member is set based upon the reading speed of the reading member.

8. The image-reading method as defined in claim 1, wherein the allowable error α is set in accordance with a desired facsimile machine standard.

9. The image-reading method as defined in claim 1, wherein the allowable error α is set in accordance with a desired printer standard.

10. An image-reading apparatus comprising:

a reading member for scanning an image to be read in a first direction so as to output image data derived from the image;

a transporting member for transporting the original document and the reading member relative to each other in a second direction that is orthogonal to the first direction; and a control member for increasing the transporting speed of the transporting member in accordance with a desired suppression in the resolution in the image data, wherein said transporting member is a stepping motor for intermittently carrying out the transporting operation; and said control member provides a control operation in which: supposing that a discrimination of the transporting member, that is, a minimum transporting interval, is F (mm/step) and a desired resolution is P (mm/line), and that an error that is allowable based upon a standard applied thereto is ±α, arbitrary integers n and I that satisfy the following inequality are found:

$$1-\alpha(F\times n)/(P\times i)<1+\alpha;$$

and supposing that the reading member has a reading speed Vp (msec/line), the transporting member has a transporting speed Vf (msec/step) that is set as follows:

$$Vf=Vp\times i/n.$$

11. The image-reading apparatus as defined in claim 10, wherein the reading member performs an image-reading operation using P×I=L (mm) as a unit block, so that transporting speed Vf is constant within the unit block.

12. The image-reading apparatus as defined in claim 11, further comprising a buffer memory for storing information data corresponding to the unit block.

13. The image-reading apparatus as defined in claim 10, further comprising a readout control member for varying the reading speed Vp so as to obtain the desired resolution P.

14. An image-reading method comprising:

transporting an image of an original document in a first direction;

scanning said image in a second direction so that said original image is read in said first direction, wherein an error that is allowable based upon a standard applied thereto for the method, ±α, is defined for integers n and i which satisfy the inequality:

$$1-\alpha\leq(F\times n)/(P\times i)\leq1+\alpha,$$

where F is a minimum transporting interval (mm/step) and P is a desired resolution (mm/line), and wherein a transporting speed Vf for a given reading speed Vp is defined by:

$$Vf=Vp\times i/n.$$

15. The method of claim 14, wherein said transporting is intermittently performed by a stepping motor, and wherein said scanning and subsequent reading is performed by light receiving elements of a reading member.

16. The method of claim 15, wherein said light receiving elements are arranged in said second direction along a line that is orthogonal to the travel of said original document in said first direction.

17. The method of claim 14, wherein arbitrary integers n and i represent driving operations (step) and reading operations (line).

18. An image-reading apparatus comprising:

a stepper motor for transporting an image of an original document in a first direction;

a plurality of light receiving elements for scanning said image in a second direction so that said original image is read out in said first direction, wherein an error that is allowable based upon a standard applied thereto for the apparatus, ±α, is defined for integers n and i which satisfy the inequality:

$$1-\alpha\leq(F\times n)/(P\times i)\leq1+\alpha,$$

where F is a minimum transporting interval (mm/step) and P is a desired resolution (mm/line), and wherein a transporting speed Vf of the stepping motor for a given reading speed for the plurality of light receiving elements Vp is defined by:

$$Vf=Vp\times i/n.$$

* * * * *